United States Patent [19]

Satoh

[11] Patent Number: 5,140,799
[45] Date of Patent: Aug. 25, 1992

[54] METHOD OF FOLDING AWAY AIR BAG FOR PASSENGER SEAT

[75] Inventor: Takeshi Satoh, Shiga, Japan

[73] Assignee: Takata Corporation, Tokyo, Japan

[21] Appl. No.: 734,738

[22] Filed: Jul. 23, 1991

[30] Foreign Application Priority Data

Aug. 20, 1990 [JP] Japan .................. 2-218431

[51] Int. Cl.⁵ .................. B65B 63/04; B60R 21/16
[52] U.S. Cl. .................. 53/429; 53/473; 280/743
[58] Field of Search .................. 53/429, 471, 473, 116; 493/940, 405, 451; 280/731, 732, 743

[56] References Cited

U.S. PATENT DOCUMENTS

| | | | |
|---|---|---|---|
| 3,756,617 | 9/1973 | Brown | 280/732 |
| 4,810,005 | 3/1989 | Föhl | 280/732 |
| 4,903,986 | 2/1990 | Cok et al. | 280/731 X |
| 4,960,292 | 10/1990 | Sadler | 280/731 |
| 4,995,638 | 2/1991 | Shinto et al. | 280/731 |
| 5,004,266 | 4/1991 | Miller et al. | 280/743 |
| 5,006,038 | 4/1991 | Frantom et al. | 280/731 X |
| 5,009,452 | 4/1991 | Miller | 280/731 X |
| 5,022,675 | 6/1991 | Zelenak, Jr. et al. | 493/940 X |
| 5,060,972 | 10/1991 | Satoh et al. | 280/743 X |

Primary Examiner—Horace M. Culver
Attorney, Agent, or Firm—Kanesaka & Takeuchi

[57] ABSTRACT

There is disclosed a method of folding away an air bag installed in front of the front passenger seat of an automobile. The bag has outwardly swelling longer side portions. The method is initiated by folding the longer side portions inwardly of the air bag to straighten both sides of the bag. The width of the shorter side portions perpendicular to the longer side portions is made slightly less than the width of an air bag case. Then, the bag is folded in alternate directions into zig-zag shape to create folds at right angles to the straightened sides. The folded bag is inserted into the case.

8 Claims, 7 Drawing Sheets

METHOD OF FOLDING AWAY AIR BAG FOR PASSENGER SEAT

FIELD OF THE INVENTION

The present invention relates to an air bag which is installed in front of a front passenger seat in an automobile and inflates automatically in an accident to protect the passenger and, more particularly, to a method of folding away this air bag when an air bag device including this bag is assembled.

BACKGROUND OF THE INVENTION

In this kind of air bag device for a front passenger seat, an air bag and an inflator are mounted to a retainer case such as a container. Also, a modular cover is mounted to the case so as to cover the bag. In case of an accident, the inflator operates to cause the air bag to inflate. Then, the modular cover is pushed by the inflating air bag and begins to open on the side of the passenger compartment. The air bag inflates greatly toward the passenger compartment to protect the passenger.

This modular cover is provided with a tear start line or bend start line. When the inflator operates, the modular cover is pushed by the air bag and tears or bends along the start line. Then, the cover begins to open on the side of the car interior.

When the air bag of the air bag device for a front passenger seat is expanded on a plane, each longer side portion swells outwardly in an arc. Therefore, when the air bag is folded away, the swelling longer side portions are not neatly folded away. This creates wasteful space inside the case, or it is difficult to insert the bag into the case.

SUMMARY OF THE INVENTION

It is an object of the present invention to provide a method of folding an air bag into a boxlike form in such a way that the folded bag can be easily inserted into a case, such as a container or small casing, which holds the air bag.

It is another object of the invention to provide a method of folding away an air bag inside a case without creating any wasteful space in it to thereby permit the case to be reduced in size, thus making the air bag device compact.

It is a further object of the invention to provide a method of folding an air bag into zig-zag shape such that the bag can be smoothly inflated.

The above objects are achieved in accordance with the teachings of the invention by a method of folding away an air bag installed in front of the front passenger seat of an automobile, the air bag having outwardly swelling longer side portions, said method comprising the steps of: folding the longer side portions inwardly of the air bag to straighten out both sides of the air bag and making the width of shorter side portions perpendicular to the longer side portions slightly less than the width of an air bag case; folding the air bag into zig-zag shape along the straightened both sides to create folds at right angles to the straightened both sides; and inserting the folded air bag into the air bag case.

The outwardly swelling longer side portions are folded inwardly of the air bag to straighten both sides of the bag as described above. Therefore, when the bag has been folded away, both of the longer sides of the bag are linear or rectilinear. Hence, the bag can be neatly folded into a boxlike form.

DETAILED DESCRIPTION OF THE INVENTION

Figure 1:
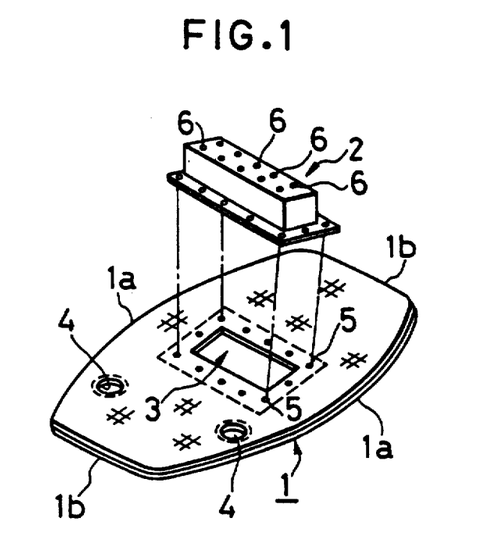
FIG. 1 is a perspective view of an air bag.

Referring to FIG. 1, there are shown a small casing 2 and an air bag 1 that is expanded on a plane. The bag 1 has straight shorter sides 1b and swelling curved longer sides 1a. An opening 3 is formed in the center of the surface of the bag 1 which is on the opposite side of the passenger, to introduce gas from an inflator. The bag 1 is also provided with vent holes 4 which permit the gas to escape from the bag to mitigate the shock when the passenger collides against the inflating bag. Rivet holes 5 are formed to mount the casing to the bag 1. The dotted line in FIG. 1 indicates a line of perforation. The bottom surface of the casing 2 is provided with holes 6 to allow passage of gas from the inflator.

Figure 2:
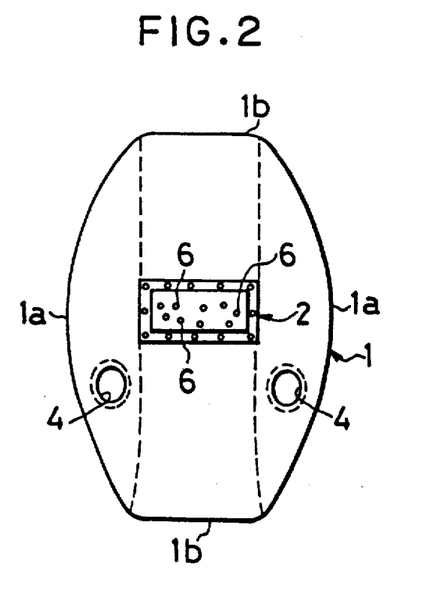
FIG. 2 is a plan view of the air bag shown in FIG. 1.
Figure 3A:
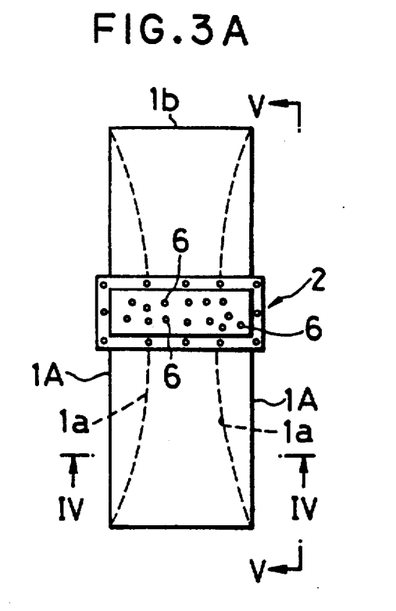
FIGS. 3A and 3B are a plan view and a perspective view, respectively, of the air bag shown in FIG. 1, for illustrating the manner in which the bag is folded away.
Figure 3B:
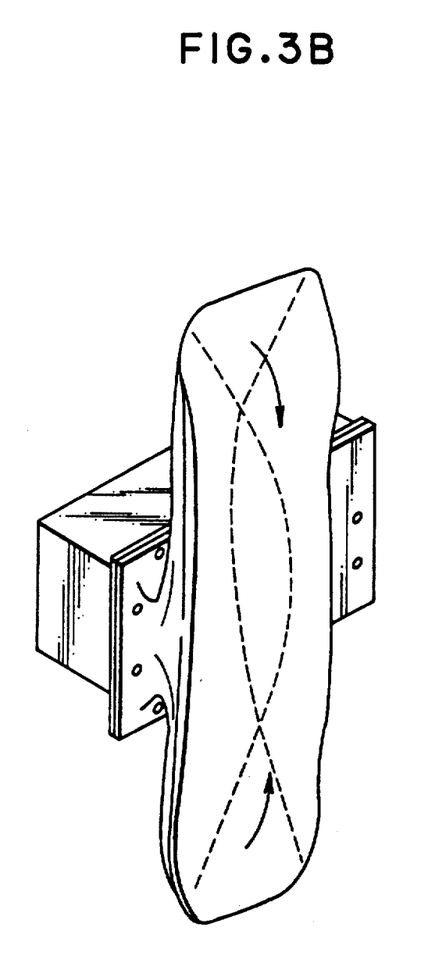
Figure 4:
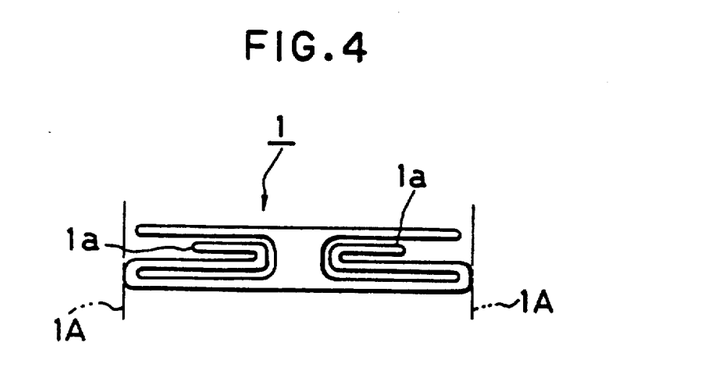
FIG. 4 is a cross section taken on line of IV—IV of FIG. 3A.
Figure 5:
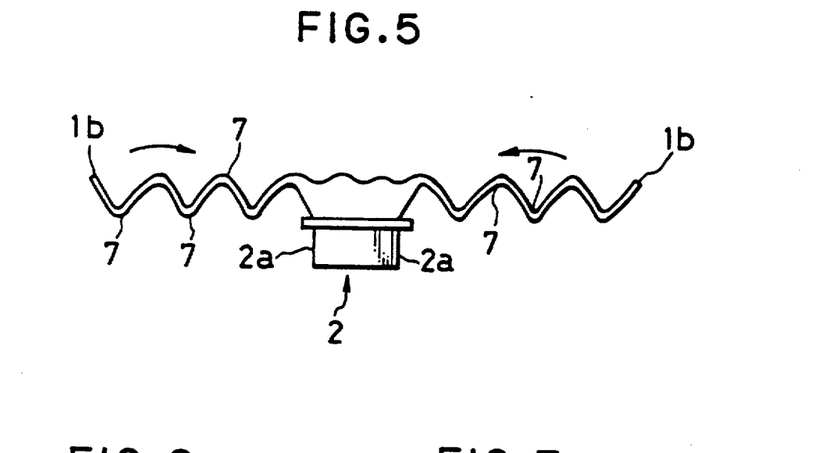
FIGS. 5, 6, and 7 are side elevations of the air bag shown in FIGS. 1-4, for illustrating the manner in which the bag is folded away.
Figure 6:
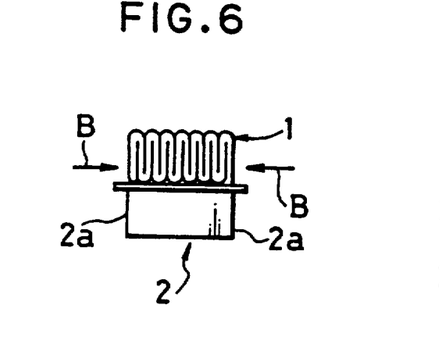
Figure 7:
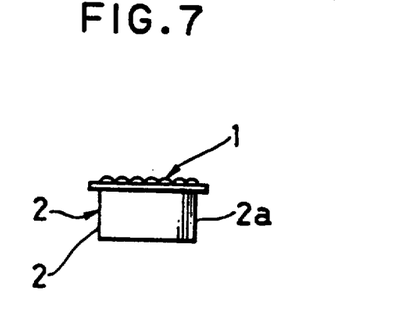

When the air bag 1 should be inserted into the small casing 2, the bag is first expanded on a plane while the casing 2 is coupled to the fringes of the opening 3 as shown in FIG. 2. Then, as shown in FIGS. 3A, 3B, and 4, the longer sides 1a and their surroundings are folded inwardly of the air bag 1 to make the width of the bag 1 uniform so that it is somewhat less than the width of the casing 2. FIG. 4 is a cross section taken on line IV—IV of FIG. 3A. Then, as shown in FIG. 5 that is a side elevation taken from the direction indicated by the line V—V of FIG. 3A, the air bag 1 is folded many times into zig-zag shape along the longer sides 1a in such a way that folds 7 are formed perpendicularly to the straight longer sides 1a. That is, the bag is bent in alternate directions. As shown in FIG. 6, the slips formed between the successive folds are brought into contact with each other, pushed in the direction indicated by the arrow B, and compressed. Subsequently, the air bag 1 is pushed downward as viewed in FIG. 6 and inserted into the casing 2 as shown in FIG. 7. The bag 1 may be so enclosed in the casing that the shorter sides 1b are located around the center of the casing 2. Also, the bag 1 may be enclosed in the casing such that the shorter sides 1b extend along the outer surface 2a of the casing 2.

In this method of folding away the air bag, it can be folded into a boxlike form. This facilitates inserting the folded bag 1 into the casing 2 which holds the bag 1. Also, no wasteful space is created inside the casing 2. This permits miniaturization of the casing and makes it possible to render the air bag device compact. Additionally, the bag 1 can be expanded smoothly, because it is folded into zig-zag shape.

The air bag device assembled by this method is shown in FIGS. 8A, 8B, 9, 10, where the device is generally indicated by reference numeral 10. A modular cover 14 is mounted to the front surface of a container 12. The aforementioned inflator, indicated by 16, is rigidly fixed inside the container 12. The small casing 2 is inserted in the container 12 while the air bag is folded. The casing 2 is provided with the holes 6. Gas released from the inflator 16 passes through the holes 6 and inflates the air bag 1. The casing 2 has a flange 20a to which the fringes of the opening in the air bag 1 are secured.

Figure 10:
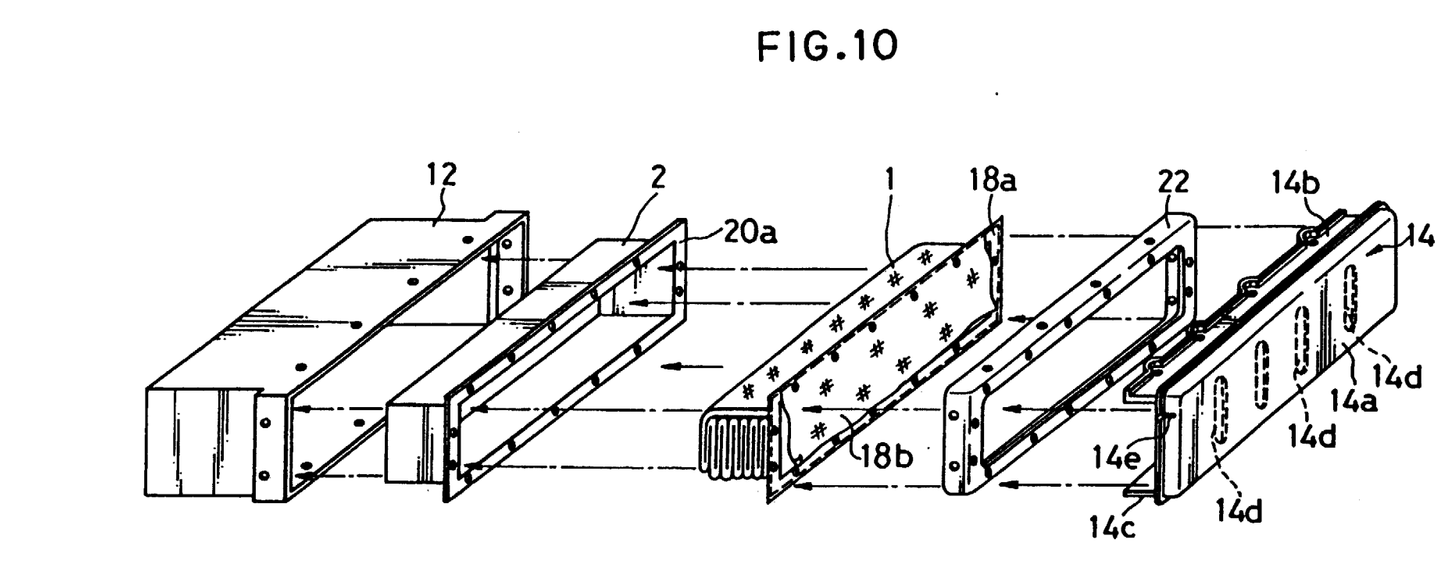
FIG. 10 is an exploded perspective view of the air bag device shown in FIGS. 8A, 8B, 9.

The container 12 takes a boxlike form. A frame 22 of L-shaped cross section is mounted at the inner fringes of the opening on the front side of the container 12. The flange 20a of the casing 2 and the fringes of the opening 3 in the air bag 1 are mounted to the rear side of the frame 22 with rivets 24.

Figure 9:
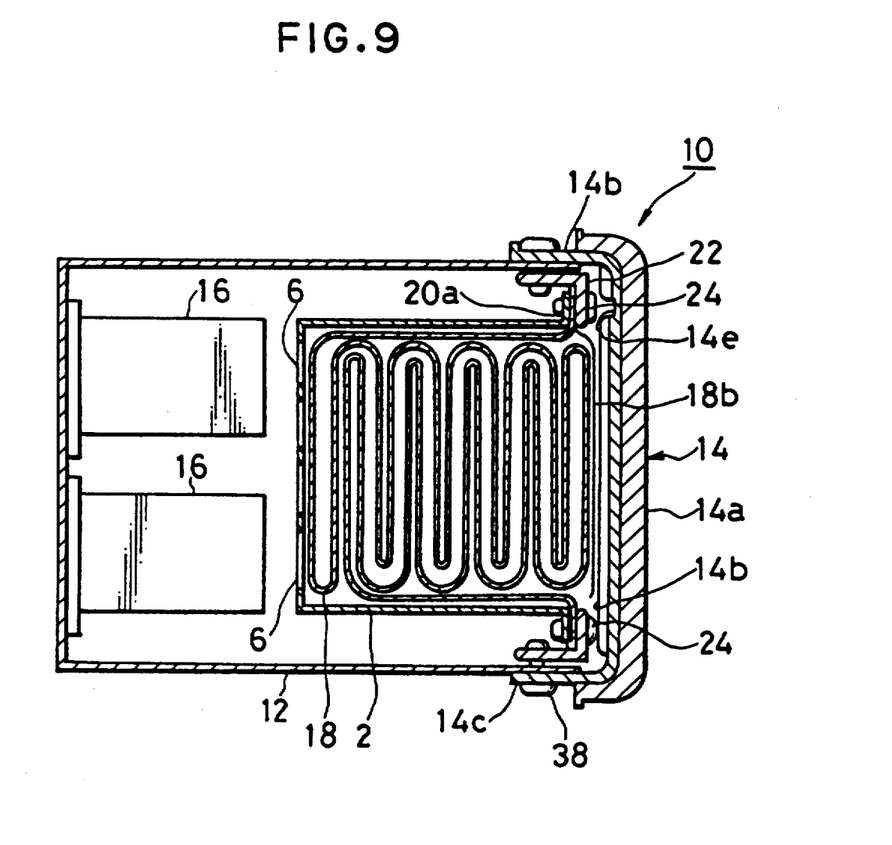
FIG. 9 is a cross section taken on line IX—IX of FIG. 8A.

A masking cloth 18b is stretched over the front surface of the air bag 1 and located between the bag 1 and the modular cover 14 to prevent the bag 1 from coming into direct contact with the cover 14.

The modular cover 14 comprises a body portion 14a that is sized to cover the opening in the front surface of the casing 12, an upper flange 14b extending rearward from the upper side of the body portion 14a, and a lower flange 14c extending rearward from the lower side of the body portion 14a. Ribs 14d are formed on the rear surface of the body portion 14a. The side surfaces of the body portion 14a are provided with grooves 14e to permit the body portion 14a to be unfolded easily. Slits 32 are formed in the lower flange 14c of the modular cover 14. Rivets 38 are engaged in the slits 32 to anchor the cover 14 to the casing 12. When pressure acting in the forward direction is produced inside the bag, the cover 14 is disengaged from the casing 12.

Figures 8A, 8B:
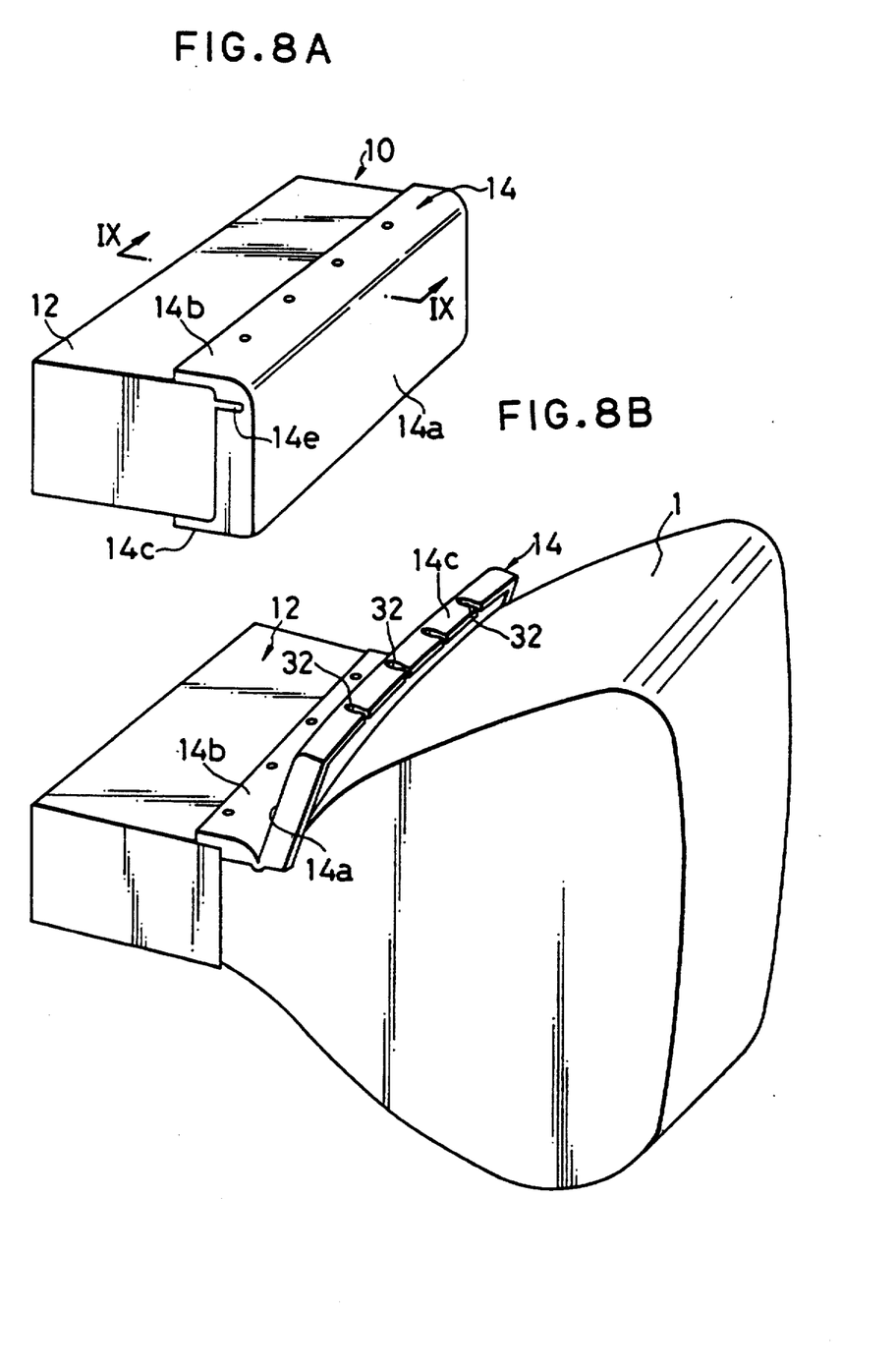
FIG. 8A is a perspective view of an air bag device.
FIG. 8B is a perspective view of the air bag device shown in FIG. 8A, and in which the air bag has been inflated.

In the operation of the air bag device 10 constructed as described above, when the inflator 16 operates, the air bag 1 is inflated. The resulting pressure pushes the modular cover 14, moving the lower half of the cover 14 forwardly. The cover 14 is still subjected to the inflating force of the bag 1. The cover 14 is bent along the grooves 14e and begins to be swung open forward. As shown in FIG. 8B, the air bag 1 is unfolded inside the car interior to protect the passenger.

In the above example, the modular cover 14 is designed to be bent along the grooves 14e. Obviously, the invention can be applied to an air bag device in which the modular cover is torn up and opens on the side of the car interior when the air bag inflates.

In the above example, the air bag is enclosed in the casing. It is also possible to directly insert the air bag in the container.

Figure 11A:
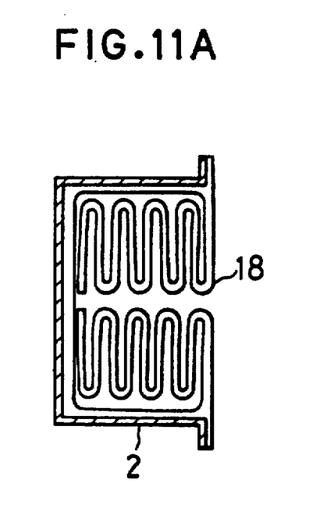
FIGS. 11A, 11B, and 11C are cross sections of an air bag, for illustrating other methods of folding away the bag.
Figure 11B:
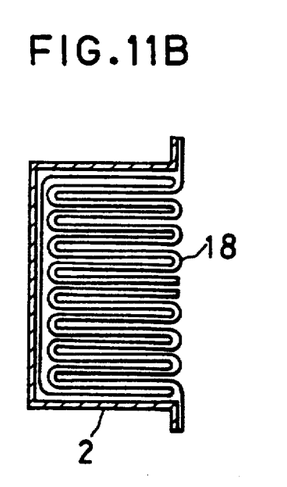
Figure 11C:
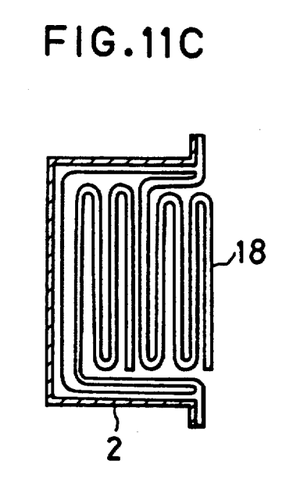

FIGS. 11A, 11B, and 11C are cross sections illustrating other methods of folding away an air bag and inserting it into the casing 2. As shown in these figures, various methods are available to insert the air bag into the casing 2 after folding the bag in alternate directions. The invention is not limited to the method described in connection with FIGS. 3A-7.

What is claimed is:

1. A method of folding an air bag into an air bag case, said air bag being installed in front of a front passenger seat in an automobile and having outwardly swelling long said portions and short side portions, said method comprising the steps of:

folding the long side portions of the air bag inwardly to have straight parallel edges, said long side portions being disposed between front and rear portions of the air bag and a distance between the straight edges of the folded air bag being shorter than a width of the air bag case to thereby form two elongated portions extending from the air bag case, folding the elongated portions of the air bag into zig-zag shape so that the elongated portions are bent and parts of the elongated portions laminate with each other, and inserting the laminated portions into the air bag case so that edges of the laminated portions orient substantially perpendicularly to a module cover of the air bag case and are directed to the front passenger seat.

2. The method of claim 1, wherein said air bag case has long sides and short sides and is attached to a center of the air bag so that the long sides of the air bag case are substantially parallel to the short side portions of the air bag, said air bag folded in the zig-zag shape being arranged parallel to the long sides of the air bag case to be easily opened when the air bag is inflated.

3. The method of claim 2, wherein when the long side portions of the air bag are folded, the front and rear portions of the air bag are flattened so that one of the front and rear portions has a width shorter than that of the air bag case, and the other of the front and rear portions has a width longer than that of the air bag case and is folded behind the portion of the air bag with the short width.

4. A method of folding an air bag into an air bag case, said air bag being installed in front of a front passenger seat in an automobile and having outwardly swelling long side portions and short side portions, said method comprising the steps of:

folding the long side portions of the air bag inwardly to have straight parallel edges, said long side portions being disposed between front and rear portions of the air bag and a distance between the straight edges of the folded air bag being shorter than a width of the air bag case to thereby form two elongated portions extending from the air bag case, folding the elongated portions of the air bag into zig-zag shape so that the elongated portions are bent and parts of the elongated portions laminate with each other, and inserting the laminated portions into the air bag case so that the laminated portions orient substantially parallel to a module cover of the air bag case.

5. The method of claim 4, wherein said air bag case has long sides and short sides and is attached to a center of the air bag so that the long sides of the air bag case are substantially parallel to the short side portions of the air bag, said air bag folded in the zig-zag shape being arranged parallel to the long sides of the air bag case to be easily opened when the air bag is inflated.

6. The method of claim 5, wherein when the long side portions of the air bag are folded, the front and rear portions of the air bag are flattened so that one of the front and rear portions has a width shorter than that of the air bag case, and the other of the front and rear portions has a width longer than that of the air bag case and is folded behind the portion of the air bag with the short width.

7. The method of claim 6, wherein the laminated portions of each elongated portions of the air bag are disposed inside the air bag case adjacent to each other without affecting to each other.

8. The method of claim 6, wherein the laminated portions of each elongated portions of the air bag are disposed inside the air bag case adjacent to each other while the laminated portions of one elongated portion are disposed over the laminated portions of the other elongated portion.

* * * * *